(12) United States Patent
Maskaliunas et al.

(10) Patent No.: US 12,320,427 B2
(45) Date of Patent: Jun. 3, 2025

(54) HYDRODYNAMIC SEALING ELEMENT FOR A RADIAL SHAFT SEAL

(71) Applicant: AMSTED RAIL COMPANY, INC., Chicago, IL (US)

(72) Inventors: Linas Maskaliunas, Vancouver, WA (US); Brian Ford, Moseley, VA (US)

(73) Assignee: AMSTED RAIL COMPANY, INC., Chicago, IL (US)

( * ) Notice: Subject to any disclaimer, the term of this patent is extended or adjusted under 35 U.S.C. 154(b) by 0 days.

(21) Appl. No.: 18/122,050

(22) Filed: Mar. 15, 2023

(65) Prior Publication Data

US 2024/0309952 A1    Sep. 19, 2024

(51) Int. Cl.
*F16J 15/32* (2016.01)
*F16J 15/3212* (2016.01)
*F16J 15/3228* (2016.01)
*F16J 15/3244* (2016.01)

(52) U.S. Cl.
CPC ....... *F16J 15/3244* (2013.01); *F16J 15/3212* (2013.01); *F16J 15/3228* (2013.01)

(58) Field of Classification Search
CPC .... F16J 15/324; F16J 15/3244; F16J 15/3212; F16J 15/3284; F16J 15/3228
See application file for complete search history.

(56) References Cited

U.S. PATENT DOCUMENTS

| | | | | |
|---|---|---|---|---|
| 2,867,457 A | * | 1/1959 | Riesing | F16J 15/3248 277/573 |
| 3,497,225 A | * | 2/1970 | Workman | F16J 15/32 134/67 |
| 3,515,395 A | * | 6/1970 | Weinand | F16J 15/3244 277/559 |
| 3,586,342 A | * | 6/1971 | Staab | F16J 15/3244 277/560 |
| 3,785,660 A | * | 1/1974 | Bush | F16J 15/3244 277/560 |
| 3,807,743 A | * | 4/1974 | Burke | F16J 15/3244 277/567 |
| 3,895,814 A | * | 7/1975 | Kupfert | F16J 15/3244 277/560 |

(Continued)

OTHER PUBLICATIONS

International Patent Application No. PCT/US2024/019930 International Search Report and Written Opinion dated May 6, 2024, 9 pages.

*Primary Examiner* — Eugene G Byrd
*Assistant Examiner* — L. Susmitha Koneru
(74) *Attorney, Agent, or Firm* — COZEN O'CONNOR

(57) ABSTRACT

A hydrodynamic sealing element for a radial shaft seal includes a radial flange leg encircling a rotation axis and an oblique flange leg encircling the rotation axis and joined to the radial flange leg. The oblique flange leg extends both radially inward and axially away from the radial flange leg to form an oblique angle relative to the radial flange leg. The oblique flange leg has an air-side surface and an end face that meet at a lip. The oblique flange forms a plurality of hydrodynamic indentations that extend into the oblique flange leg from the air-side surface. The sealing element may be formed from leather, in which case the indentations may be created by debossing the leather. The sealing element may be inserted into a seal case to create a radial shaft seal.

19 Claims, 7 Drawing Sheets

(56) References Cited

U.S. PATENT DOCUMENTS

| | | | | |
|---|---|---|---|---|
| 3,921,987 | A | * | 11/1975 | Johnston .............. F16J 15/3244 277/560 |
| 4,226,426 | A | * | 10/1980 | Messenger ........... F16J 15/3264 277/562 |
| 4,265,458 | A | * | 5/1981 | Wheeler ............... B66B 11/043 277/944 |
| 4,283,064 | A | * | 8/1981 | Staab ................... F16J 15/3284 277/560 |
| 4,399,998 | A | * | 8/1983 | Otto .................... F16C 33/7876 277/552 |
| 2002/0011710 | A1 | * | 1/2002 | Oldenburg ........... F16J 15/3256 277/612 |
| 2009/0108533 | A1 | * | 4/2009 | Ashida ................. F16J 15/3228 277/399 |

* cited by examiner

HYDRODYNAMIC SEALING ELEMENT FOR A RADIAL SHAFT SEAL

BACKGROUND

A radial shaft seal is used as part of the lubrication system around a rotating shaft. The seal includes a lip that acts as a dam that both (i) prevents lubricant from draining away from an oil side of the seal to an air side of the seal and (ii) blocks contaminants on the air side from passing to the oil side. Due to this lip, radial shaft seals are also known as lip seals. Radial shaft seals rely on a pumping mechanism that arises when the lip interacts with the rotating shift. This mechanism causes lubricant to be pumped back to the oil side. The pumping mechanism is understood to develop through an interaction between the lip and rotating shaft over time, e.g., by the formation of microasperities in the wear track.

SUMMARY

Materials commonly used for seal flanges include nitrile-butadiene (NBR) and hydrogenated nitrile-butadiene (HNBR). These materials are flexible, abrasion resistant, and resistant to oil, water and other common liquids and gases. They are also easy to mold into shapes that enhance sealing and include hydrodynamic "pumping" features. However, NBR has a glass transition temperature of approximately −30° F., with the exact value being dependent on the ACN content (i.e., the ratio of acrylonitrile to butadiene groups). HNBR has a similar glass transition temperature of approximately −40° F. As the glass transition temperature is approached, both HBR and HNBR become brittle and lose their flexibility. As a result, they tend to crack at these low temperatures, making them unsuitable for seals.

In very cold operating conditions (e.g., northern Canada, Alaska, etc.), a material with a lower glass transition temperature is preferable. One such material is leather, which has a glass transition temperature of −94° F. Leather also has similar flexibility, abrasion resistance, and liquid resistance as HBR and HBNR. However, leather cannot be molded like plastics and rubber, making it challenging to incorporate into leather seals various hydrodynamic features that enhance pumping of oil back toward the oil side and push contaminants away from the seal toward the air side. Accordingly, the incorporate of such hydrodynamic features with leather seals and flanges is not known in the prior art.

The present embodiments include a hydrodynamic sealing element that forms a plurality of indentations that act as hydrodynamic features. These indentations can be made by debossing or locally compressing the material of the seal element (as opposed to molding the sealing element to include these features) and therefore are compatible with leather flanges and leather-working tooling and techniques. When the sealing element is made of leather, the present embodiments advantageously combine the low glass transition temperature of leather with hydrodynamic pumping commonly found in rubber (e.g., HBR and HNBR) and plastic-based seals that are limited to higher operating and storage temperatures.

In embodiments, a hydrodynamic sealing element for a radial shaft seal includes a radial flange leg encircling a rotation axis and an oblique flange leg encircling the rotation axis and joined to the radial flange leg. The oblique flange leg extends both radially inward and axially away from the radial flange leg to form an oblique angle relative to the radial flange leg. The oblique flange leg has an air-side surface and an end face that meet at a lip. The oblique flange forms a plurality of hydrodynamic indentations that extend into the oblique flange leg from the air-side surface. The sealing element may be formed from leather or another type of material that can be debossed or locally compressed. The sealing element may also be inserted into a seal case to create a complete radial shaft seal.

DETAILED DESCRIPTION

Figure 1:
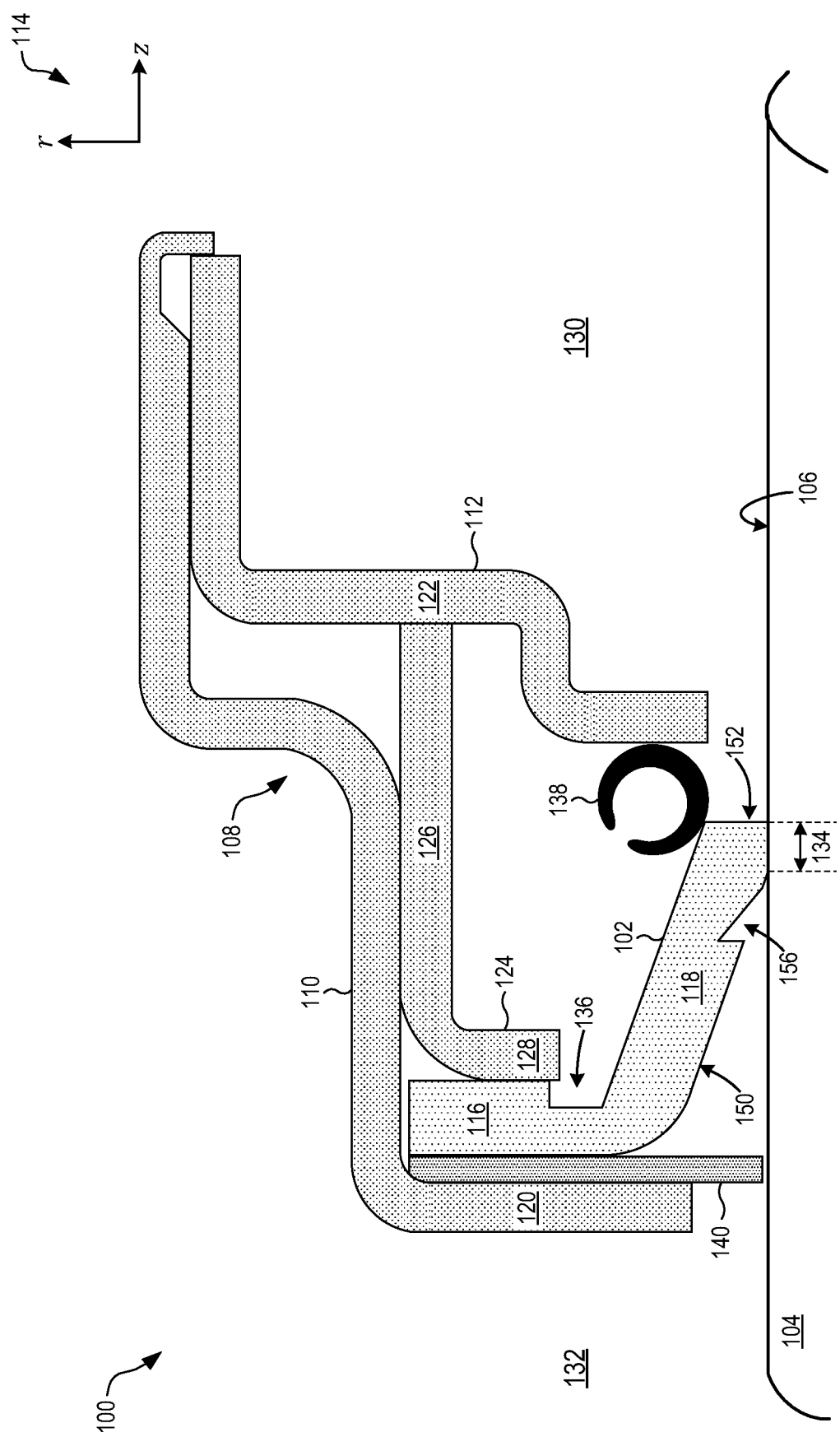
FIG. 1 is a cross-sectional view of a radial shaft seal with a hydrodynamic sealing element, in embodiments.

FIG. 1 is a cross-sectional view of a radial shaft seal 100 with a hydrodynamic sealing element 102. The radial shaft seal 100 is a rotary lip seal for use with a rotating shaft 104 having a cylindrical surface 106. The hydrodynamic sealing element 102 creates a seal between a lubricating fluid, such as oil, and an outside environment. For clarity herein, various aspects of the radial shaft seal 100 are described in terms of a fluid side 130 and an air side 132. The radial shaft seal 100 includes a seal case 108 having an outer frame 110 and an inner frame 112. Dimensions and orientations are described herein in relation to a cylindrical coordinate system 114. The z axis is parallel to the rotational axis of the shaft 104 and corresponds to axial or longitudinal directions. The r axis is perpendicular to the z axis and corresponds to radial directions.

The hydrodynamic sealing element 102 includes a radial flange leg 116 and an oblique flange leg 118. The sealing element 102 forms a plurality of hydrodynamic indentations 156 that extend radially into the oblique flange leg 118 from an air-side surface 150 of the oblique flange leg 118. Only one hydrodynamic indentation 156 is shown in FIG. 1. The hydrodynamic indentations 156 reduce friction as the shaft 104 rotates with respect to the sealing element 102. Advantageously, this reduced friction results in the sealing element 102 operating at a lower temperature, which increases its operational life.

In embodiments, the hydrodynamic sealing element 102 is made of leather. In these embodiments, the hydrodynamic indentations 156 may be made by debossing the leather (e.g., by stamping the leather with a die). However, the hydrodynamic sealing element 102 may be made from another material without departing from the scope hereof. Examples of such materials include, but are limited to, thermoplastics, elastomers, polymers, nitrile, and rubber. One such material is polytetrafluoroethylene (PTFE), either pure or mixed with additives (e.g., graphite, carbon fiber, molybdenum disulfide, boron nitride, etc.). For some of these other materials, the indentations 156 may be made by debossing, similar to leather. Alternatively, it is possible for some of these materials (e.g., plastic) to create the indentations 156 via molding.

As shown in FIG. 1, the hydrodynamic sealing element 102 need not be directly bonded to the seal case 108. For example, a spacer 124 may be used to retain the sealing element 102 between an inner radial section 120 of the outer frame 110 and a middle radial section 122 of the inner frame 112. The spacer 124 includes an axial section 126 and a radial section 128. The radial flange leg 116 is retained between the inner radial section 120 and the radial section 128. In embodiments, an excluder lip 140 is also retained between the inner radial section 120 and radial flange leg 116. The excluder lip 140 extends radially towards the shaft 104 and is used to reduce how many contaminants in the air side 132 can reach the fluid side 130. A typical value of the clearance between the excluder lip 140 and the cylindrical surface 106 is 0.008" inch. Alternatively (e.g., when there is a significant amount of contaminants in the air side 132), the excluder lip 140 may contact the cylindrical surface 106 without any clearance therebetween. Another type of excluder lip may be used, such as an axial excluder lip.

The hydrodynamic sealing element 102 has an inner diameter that is smaller than the diameter of the cylindrical surface 106. As a result, the sealing element 102 is stretched over the shaft 104 during installation of the radial shaft seal 100. Flexibility of the sealing element 102 may be provided by a relief groove 136 that allows the oblique flange leg 118 to flex radially with respect to the radial flange leg 116. After installation, a force is generated between the leather flange 102 and the shaft 104 that creates a sealing region 134. Additional radial force may be provided by a garter spring 138. Garter springs in radial lip seals augment the sealing force between the lip (see the lip 154 in FIG. 2) and the shaft 104. Furthermore, the garter spring 138 may compensate for changes in the sealing element 102 due to elevated temperatures, exposure to lubricants, wear, eccentricities (e.g., of the shaft 104 or sealing element 102), misalignment, runout, or any combination thereof. Thus, the garter spring 138 provides a more uniform load.

Figure 2:
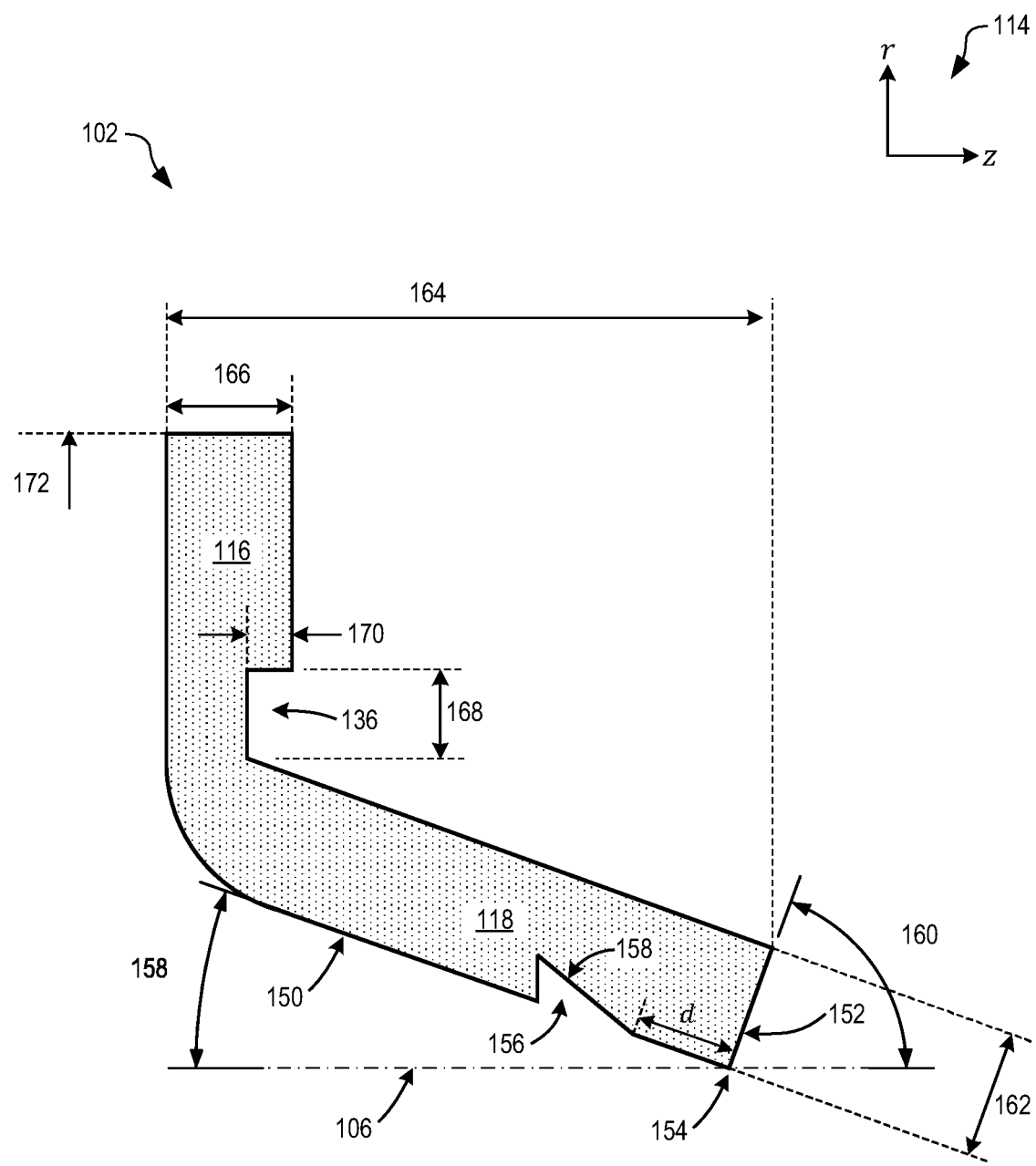
FIG. 2 is a more detailed cross-sectional view of the hydrodynamic sealing element of FIG. 1.

FIG. 2 is a more detailed cross-sectional view of the hydrodynamic sealing element 102 of FIG. 1. Although exemplary dimensions and angles are described herein, these are not limiting and are for purposes of illustration only. The oblique flange leg 118 has an air-side surface 150 and an end face 152 that meet at a lip 154. The end face 152 has a width 162. The lip 154 defines the inner diameter of the sealing element 102 when installed on the shaft 104. The air-side surface 150 forms an air-side angle 158, relative to the cylindrical surface 106, of approximately 15 to 35 degrees. The end face 152 forms a fluid-side angle 160, relative to the cylindrical surface 106, of approximately 75 to 90 degrees.

The hydrodynamic sealing element 102 has an overall axial length 164. The radial flange leg 116 has an axial width 166. The relief groove 136 has a radial height 168 and an axial depth 170. The sealing element 102 has an outer diameter 172.

Figure 3:
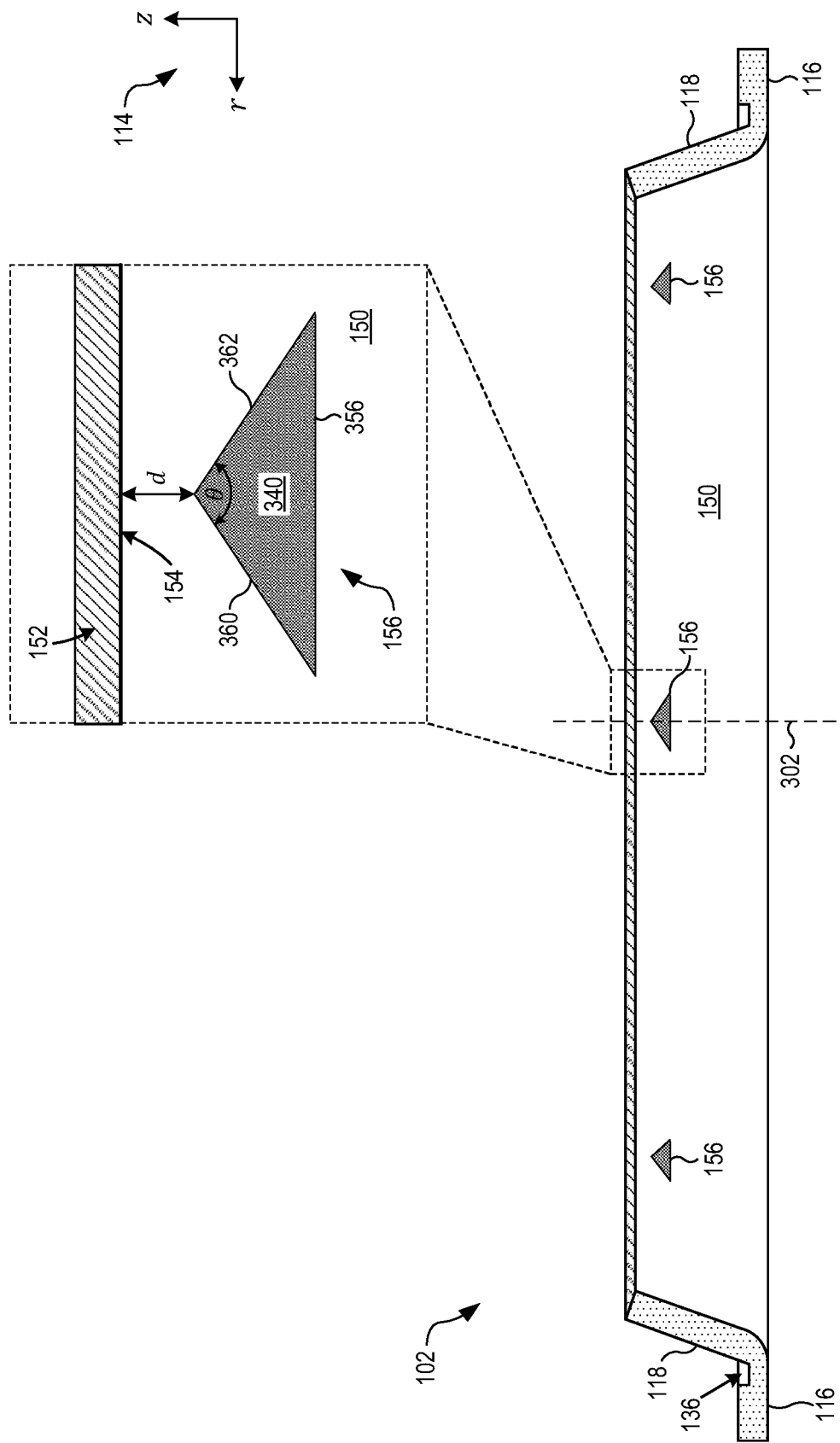
FIG. 3 is a side cross-sectional view of the hydrodynamic sealing element of FIGS. 1 and 2.

FIG. 3 is a side cross-sectional view of the hydrodynamic sealing element 102 of FIGS. 1 and 2. The view is taken through a cylindrical axis 302. The oblique flange leg 118 is frustoconical and coaxial with an axis of the shaft 104 (not shown) when the radial shaft seal 100 is installed on the shaft 104. FIG. 3 shows how several of the hydrodynamic indentations 156 are located at various azimuthal positions around the axis 302. The hydrodynamic indentations 156 are discrete, meaning that they are separate from each other (i.e., they do not form a single feature that runs continuously around the axis 302).

FIG. 3 also shows an expanded view of one of the hydrodynamic indentations 156. In this case, edges of the indentation 156 that intersect the air-side surface 150 form a triangle 340 having an apex that is nearest to the lip 154. The apex is defined by sides 360 and 362 that meet to form an apex angle θ. The triangle 340 also has a base 356 that is parallel to the lip 154. In the example of FIG. 3, the sides 360 and 362 have the same length, in which case the triangle 340 is isosceles. However, the triangle 340 may alternatively be scalene or equilateral. Also in the example of FIG. 3, the apex angle θ is greater than 90 degrees, in which case the triangle 340 is obtuse. However, the triangle 340 may alternatively be acute or right. While FIG. 3 shows all of the indentations 156 having the same shape and orientation, the indentations 156 may alternatively have different shapes, orientations, or both. For example, a first subset of the indentations 156 may have a first shape while a remaining second subset of the indentations 156 have a second shape different from the first shape. In another example, the indentations 156 have unique shapes.

The triangle 340 is positioned such that the apex is located a perpendicular distance d from the lip 154 (also see FIG. 2). The distance d should be selected such that no portion of the triangle 340 lies within the sealing region 134 when the radial shaft seal 100 is installed on the shaft 104, as the presence of hydrodynamic indentations 156 (either entirely or in part) within the sealing region 134 may prevent the lip 154 from making a proper seal everywhere around the shaft 104. Typical values of d are between 0.005 and 0.02 inches. However, d may be less than 0.005 inches or greater than 0.02 inches. While FIG. 3 shows all of the indentations 156 having the same value of d, the indentations 156 may alternatively have different values of d. For example, a first subset of the indentations 156 may have a first value of d. A remaining second subset of the indentations 156 may then have a second value of d that is different from the first value. In another example, the indentations 156 have unique values of d.

Figure 4:
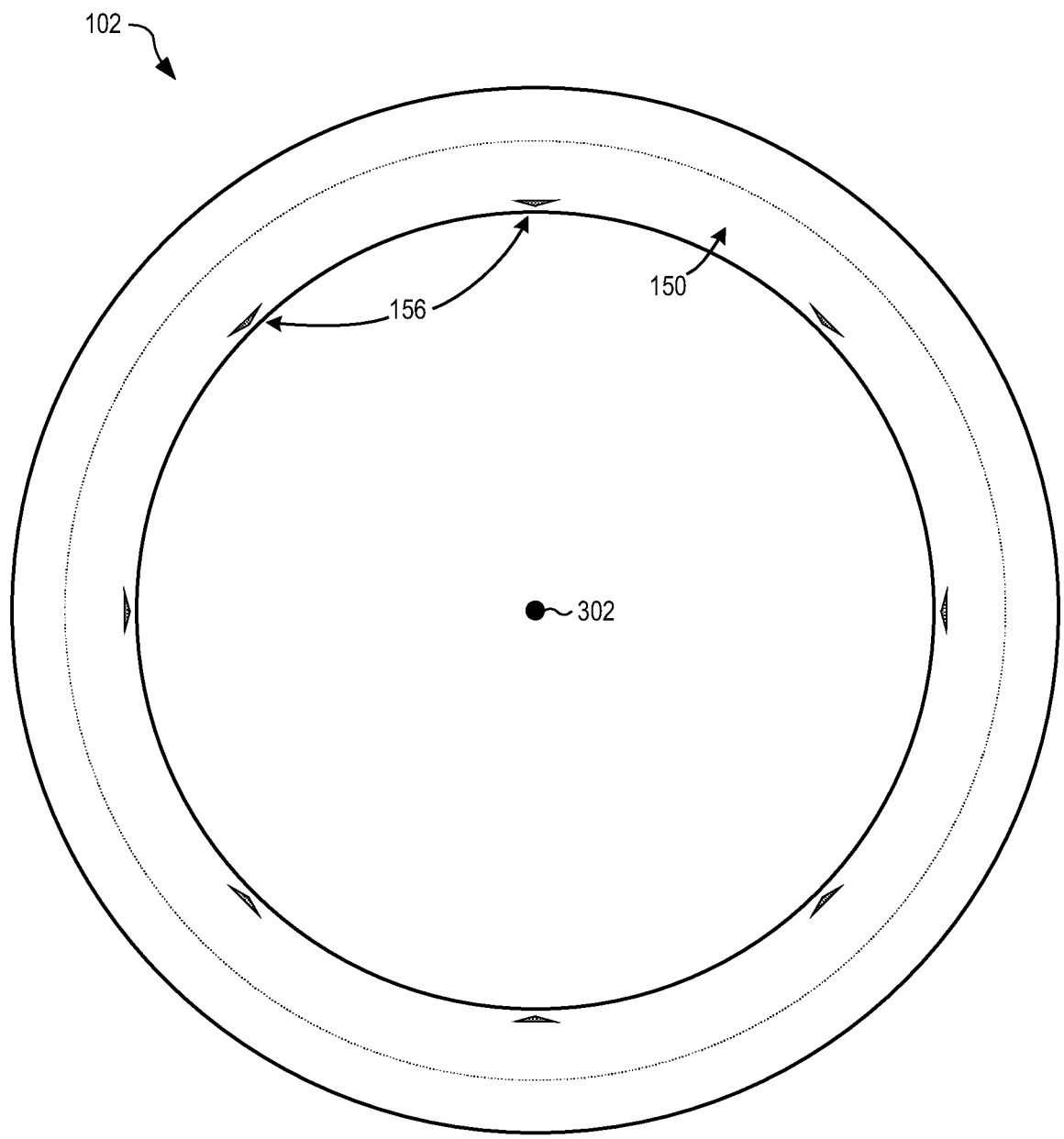
FIG. 4 is a bottom view of the hydrodynamic sealing element of FIGS. 1-3.

FIG. 4 is a bottom view of the hydrodynamic sealing element 102 of FIGS. 1-3. FIG. 4 shows how the hydrodynamic indentations 156 may be circumferentially located around the cylindrical axis 302. In the example of FIG. 4, there are eight indentations 156 that are uniformly spaced around the axis 302. Thus, each nearest-neighbor pair of indentations 156 forms an azimuthal angle of 45 degrees (taking the axis 302 as the origin). However, the indentations 156 need not be uniformly spaced in this manner. While FIG. 4 shows the sealing element 102 with eight indentations 156, the sealing element 102 may have a different number of indentations 156, either uniformly or non-uniformly spaced around the axis 302. In one embodiment, the number of indentations 156 is between five and twelve (inclusive).

Referring to FIG. 2, a depth of the hydrodynamic indentation 156 may be defined as the distance between a bottom face 158 of the hydrodynamic indentation 156 and where the air-side surface 150 would be if there was no indentation 156. As can be seen, the depth of the hydrodynamic indentation 156 is not uniform, but rather increases when moving away from the lip 154. In combination with the triangle, the hydrodynamic indentation 156 is shaped as a tetrahedron, of which the triangle 340 is one face. Alternatively, the hydrodynamic indentation 156 may have a uniform depth, in which case it is shaped as an oblique or right triangular prism.

Figure 5:
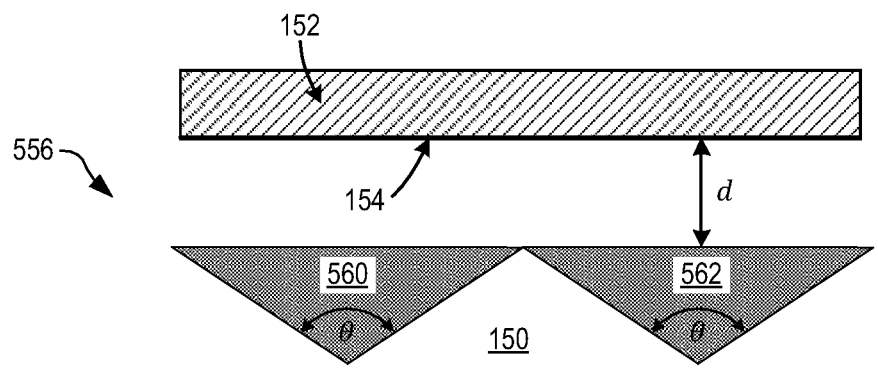
FIG. 5 illustrates a hydrodynamic indentation that is an alternative to hydrodynamic indentation shown in FIGS. 1-4, in an embodiment.

FIG. 5 illustrates a hydrodynamic indentation 556 that is an alternative to the hydrodynamic indentation 156 of FIGS. 1-4. The hydrodynamic indentation 556 forms a double tetrahedron. Specifically, edges of the indentation 556 that intersect the air-side surface 150 form a first triangle 560 and a second triangle 562 that share a base vertex. The triangles 560 and 562 have apexes that face away from the lip 154. The triangle 560 and 562 also have bases that are co-linear and parallel to the lip 154. The bases are located a perpendicular distance d from the lip 154. In the example of FIG. 5, the triangles 560 and 562 are similar (e.g., they have the same apex angle θ). However, the triangles 560 and 562 need not be similar. For example, triangles may have different apex angles. When considering the depth of the indentation 556, each of the triangles 560 and 562 may be one face of a tetrahedron or an end face of an oblique or right triangular prism. In another embodiment, the hydrodynamic indentation 556 forms a triple tetrahedron. More general, the hydrodynamic indentation 556 may form a chain of n≥2 touching tetrahedra.

Figure 6:
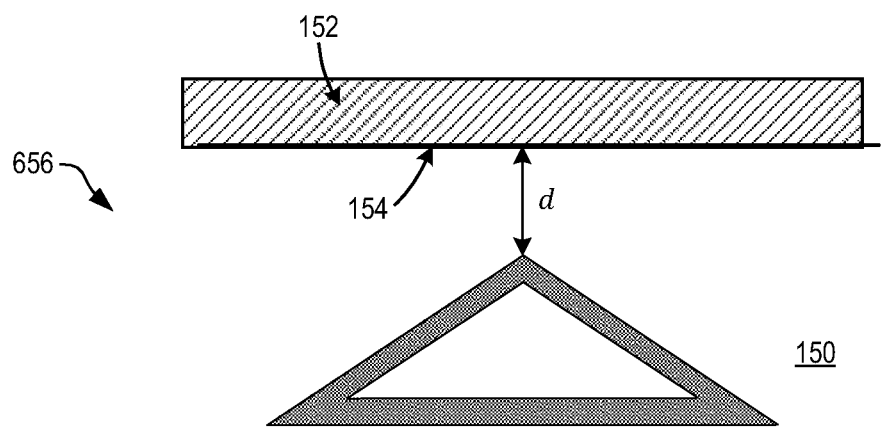
FIG. 6 illustrates a hydrodynamic indentation that is an alternative to the hydrodynamic indentations of FIGS. 1-5, in an embodiment.

FIG. 6 illustrates a hydrodynamic indentation 656 that is an alternative to the hydrodynamic indentation 156 of FIGS. 1-4 and the hydrodynamic indentation 556 of FIG. 5. The indentation 656 is similar to the indentation 156 except that it forms a triangular annulus. When considering the depth of the indentation 656, the triangular annulus may be a face of a tetrahedral shell or triangular-prism shell (either oblique or right).

It should be understood that the hydrodynamic indentations 156, 556, and 656 are merely examples of various shapes, sizes, and orientations of hydrodynamic indentations that can be used with the present embodiments. More generally, each hydrodynamic indentation may be any type of three-dimensional shape. Examples of such shapes include, but are not limited to, polyhedra (either regular or irregular), prisms (right or oblique), shells, and the like. Other examples include three-dimensional shapes having one or more curved faces, such as the volumes enclosed by quadric surfaces (e.g., ellipsoids, spheres, spheroids, cylinders, cones, etc.) or shells thereof. Each hydrodynamic indentation may be a portion of any of these three-dimensional shapes (e.g., a hemi-sphere). Each hydrodynamic indentation may be any other type of shape known in the art without departing from the scope hereof.

Figure 7:
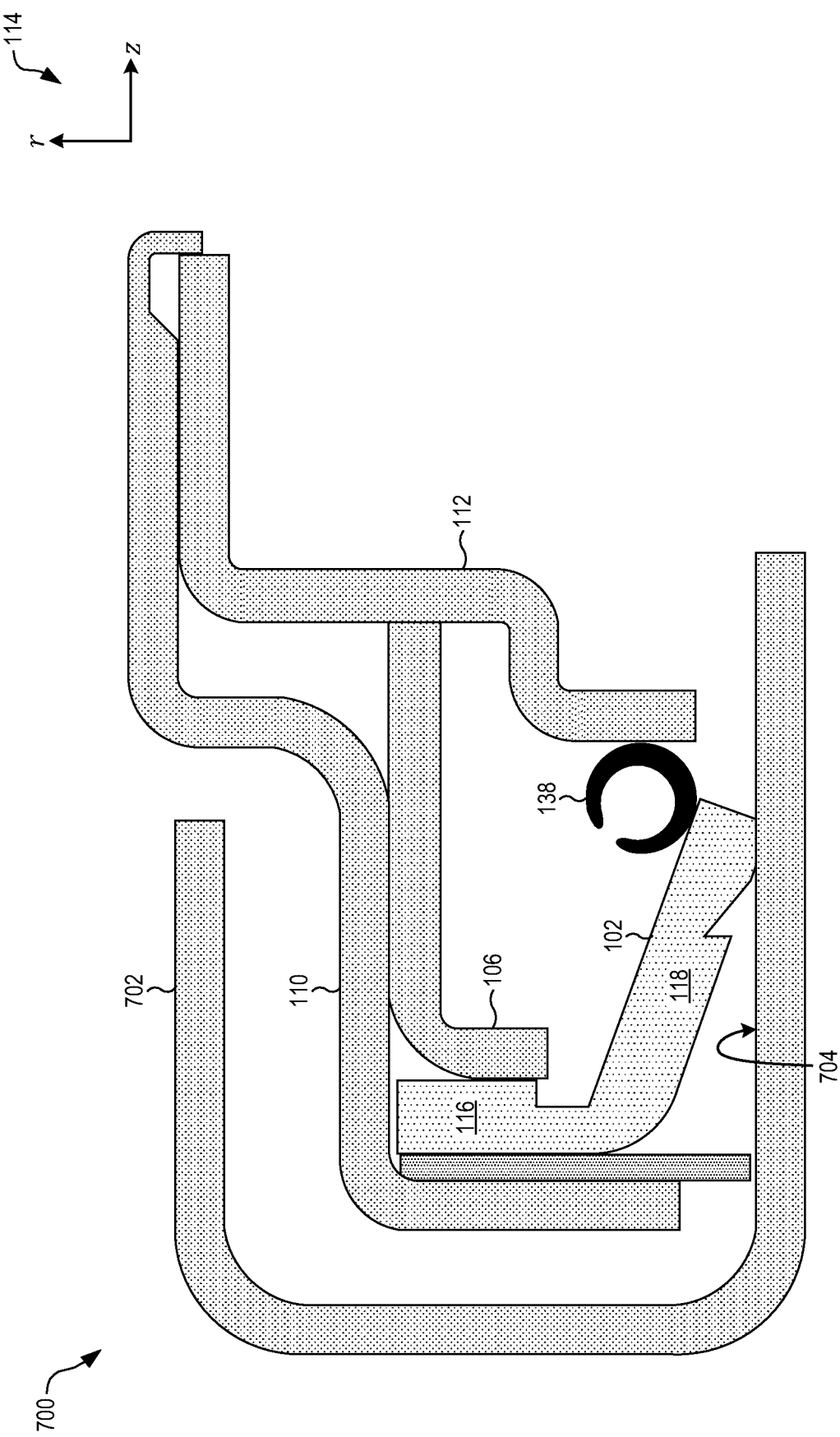
FIG. 7 is a cross-sectional view of a radial seal assembly that combines the radial shaft seal of FIG. 1 with a sleeve, in an embodiment.

FIG. 7 is a cross-sectional view of a radial seal assembly 700 that combines the radial shaft seal 100 of FIG. 1 with a sleeve 702. In embodiments, a unitized seal may be provided with the sleeve 702 in situations where the shaft 104 is stationary and the seal assembly is rotating, for example. As shown in FIG. 7, the hydrodynamic sealing element 102 forms a sealing region, or lip seal, with a radially outward-facing surface 704 of the sleeve 702.

Figure 8:
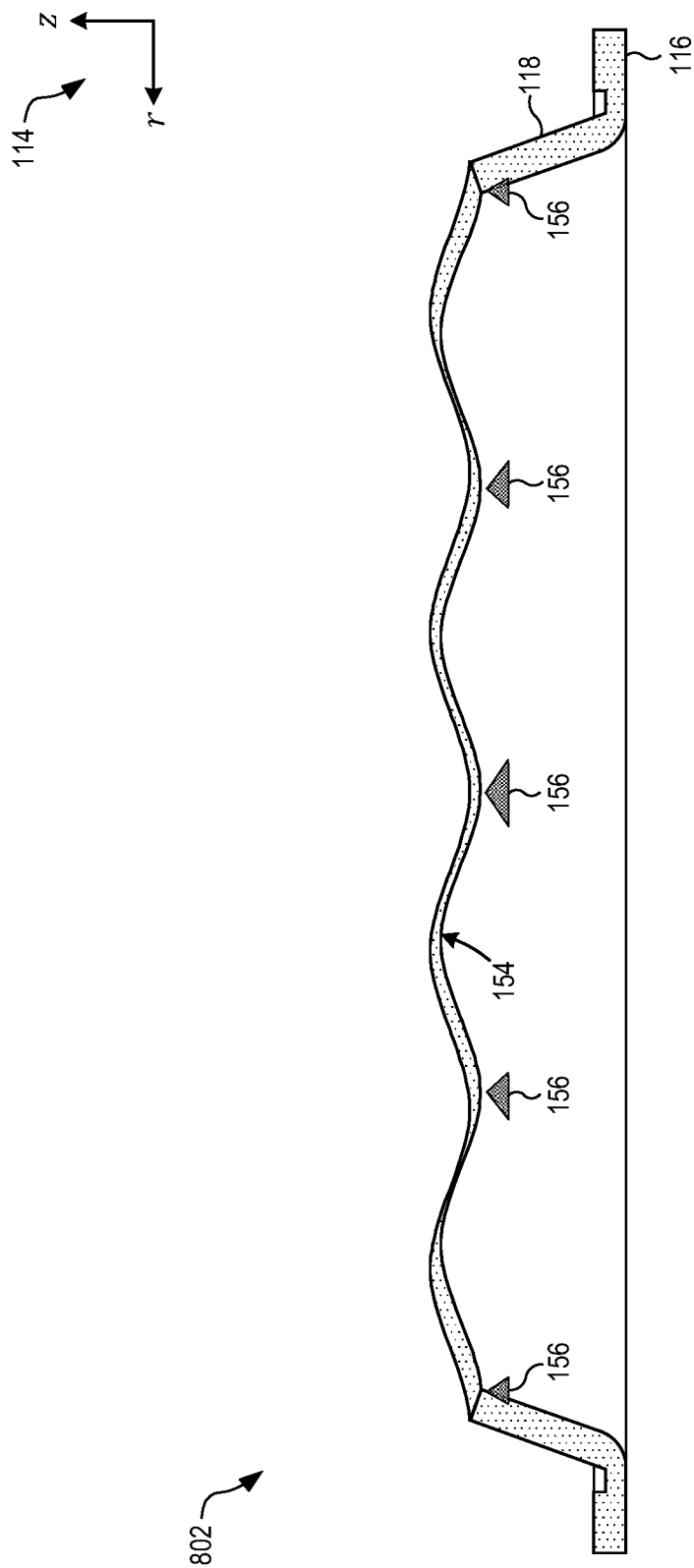
FIG. 8 is a side cross-sectional view of a hydrodynamic sealing element that is similar to the hydrodynamic sealing element of FIGS. 1-4 except that it has a lip that forms a sinusoidal wave pattern around its circumference, in an embodiment.

FIG. 8 is a side cross-sectional view of a hydrodynamic sealing element 802 that is similar to the hydrodynamic sealing element 102 of FIGS. 1-4 except that the end face 152 is shaped such that the lip 154 forms a sinusoidal wave pattern, or lip profile, around its circumference. As the lip 154 rotates relative to the shaft 104, this sinusoidal wave pattern creates an axial back-and-forth sweeping action that both pumps oil back toward the oil side of the seal (see fluid side 130 in FIG. 1) and pushes external contaminants back toward the air side of the seal. The sinusoidal wave pattern advantageously produces less friction, and therefore lowers operating temperatures, as compared to lip seals without this feature. More details about sinusoidally varying lips can be found, for example, in U.S. Pat. Nos. 3,927,600, 4,283,064, and 9,995,396. FIG. 8 illustrates how hydrodynamic indentations 156 can be used to further enhance the performance of lip seals that use sinusoidally varying lips. While FIG. 8 shows hydrodynamic indentations 156 only located at the troughs of the sinusoidal wave pattern, the hydrodynamic indentations 156 may be located at any combination of peaks, troughs, and nodes of the sinusoidal wave pattern. Note that the amplitude of the sinusoidal wave pattern is exaggerated in FIG. 8 for clarity.

Changes may be made in the above methods and systems without departing from the scope hereof. It should thus be noted that the matter contained in the above description or shown in the accompanying drawings should be interpreted as illustrative and not in a limiting sense. Herein, and unless otherwise indicated: (a) the adjective "exemplary" means serving as an example, instance, or illustration, and (b) the phrase "in embodiments" is equivalent to the phrase "in certain embodiments," and does not refer to all embodiments. The following claims are intended to cover all generic and specific features described herein, as well as all statements of the scope of the present method and system, which, as a matter of language, might be said to fall therebetween.

What is claimed is:

1. A hydrodynamic sealing element for a radial shaft seal, comprising:
    a radial flange leg encircling a rotation axis; and
    an oblique flange leg encircling the rotation axis and joined to the radial flange leg, the oblique flange leg extending both radially inward and axially away from the radial flange leg to form an oblique angle relative to the radial flange leg, the oblique flange leg having an air-side surface and an end face that meet at a lip;
    wherein the oblique flange leg forms a plurality of hydrodynamic indentations that extend into the oblique flange leg from the air-side surface;
    wherein the edges of each hydrodynamic indentation that intersect the air-side surface form a triangle having an apex and a base, and the apex is closer to the lip than the base.

2. The hydrodynamic sealing element of claim 1, comprising leather.

3. The hydrodynamic sealing element of claim 1, the plurality of hydrodynamic indentations being formed by debossing.

4. The hydrodynamic sealing element of claim 1, the plurality of hydrodynamic indentations being distributed uniformly about the rotation axis.

5. The hydrodynamic sealing element of claim 1, a number of the plurality of hydrodynamic indentations being between five and twelve.

6. The hydrodynamic sealing element of claim 1, all of the plurality of hydrodynamic indentations having the same shape.

7. The hydrodynamic sealing element of claim 1, wherein:
    each of the plurality of hydrodynamic indentations is shaped as a tetrahedron.

8. The hydrodynamic sealing element of claim 7, wherein:
    the triangle is an isosceles triangle.

9. The hydrodynamic sealing element of claim 7, the apex having an apex angle greater than ninety degrees.

10. The hydrodynamic sealing element of claim 7, a shortest distance between the apex and the lip being less than 0.02 inches.

11. The hydrodynamic sealing element of claim 1, wherein:
   each of the plurality of hydrodynamic indentations is shaped as a tetrahedral shell; and
   edges of the tetrahedral shell that intersect the air-side surface form a triangular annulus.

12. The hydrodynamic sealing element of claim 1, wherein:
   respective pairs of hydrodynamic indentations are shaped as a double tetrahedron; and
   edges of the double tetrahedron that intersect the air-side surface form a double triangle.

13. The hydrodynamic sealing element of claim 12, wherein:
   the double triangle comprises a first triangle having a first apex and a first base;
   the double triangle comprises a second triangle having a second apex and a second base;
   the first triangle and the second triangle have the same area;
   the first base and the second base are co-linear and share a base vertex;
   the first base is closer to the lip than the first apex; and
   the second base is closer to the lip than the second apex.

14. The hydrodynamic sealing element of claim 1, the end face forming a sinusoidal pattern around a circumference of the flange seal such that an axial position of the lip varies sinusoidally about the rotation axis.

15. The hydrodynamic sealing element of claim 1, the radial flange leg forming a relief groove where the radial flange leg meets the oblique flange leg.

16. The hydrodynamic sealing element of claim 1, the oblique flange leg and the radial flange leg having a similar thickness.

17. A radial shaft seal, comprising:
   the hydrodynamic sealing element of claim 1; and
   a seal case encircling the rotation axis, the seal case comprising an inner frame, an outer frame, and a spacer between the inner frame and the outer frame, the spacer pushing the radial flange leg of the flange seal against the outer frame.

18. The radial shaft seal of claim 17, further comprising a sleeve with a radially outward-facing sleeve surface, the lip of the flange seal contacting the radially outward-facing surface to form a sealing region.

19. The radial shaft seal of claim 18, further comprising a garter spring encircling the oblique flange leg, the garter spring being axially positioned to radially compress the lip against the radially outward-facing sleeve surface.

* * * * *